June 27, 1972 C. G. JOA 3,673,021
METHOD OF MAKING A LAMINATED MAT FROM PLIES
OF FIBROUS PULP MATERIAL
Filed Feb. 3, 1969
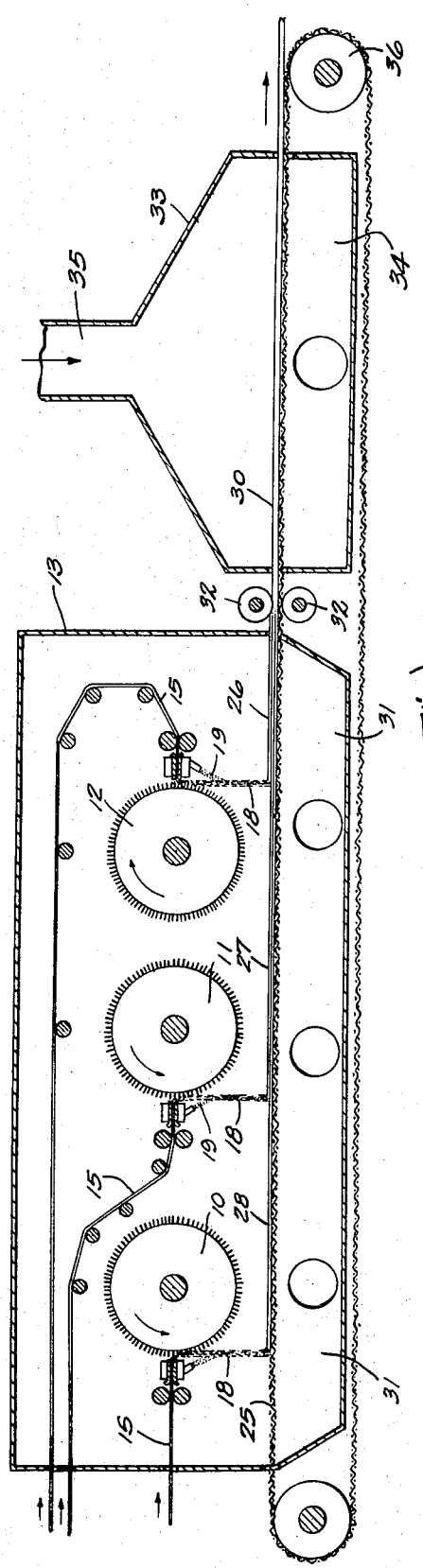
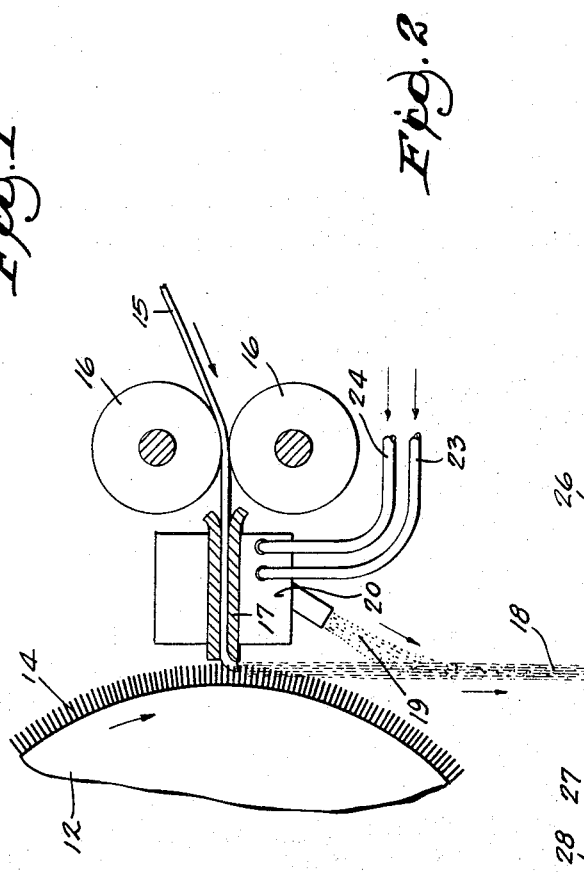
INVENTOR
CURT G. JOA
BY Wheeler, Wheeler, House & Clemency
ATTORNEYS

United States Patent Office 3,673,021
Patented June 27, 1972

3,673,021
METHOD OF MAKING A LAMINATED MAT FROM PLIES OF FIBROUS PULP MATERIAL
Curt G. Joa, Town of Ocean Ridge, Fla.
(Box 1121, Boynton Beach, Fla. 33435)
Filed Feb. 3, 1969, Ser. No. 795,840
Int. Cl. B29j 5/00
U.S. Cl. 156—62.4                               3 Claims

ABSTRACT OF THE DISCLOSURE

A composite mat of laminated separately formed plies of pulp fibers picked from a pulp board and sprayed with adhesive while airborne to thoroughly expose the fibers to the adhesive before the ply is formed. Such multiple plies are laminated and bound together by said adhesive into said composite mat. The apparatus comprises a tandem series of pulp fiberizers which concurrently form such plies and laminate the plies into said composite mat.

BACKGROUND OF THE INVENTION

It is desirable in the manufacture of sanitary napkins, diapers, hospital pads, etc., that the absorbent material thereof be present in the form of a mat having uniform consistency with respect to thickness, weight, density, and absorbability. The fiberizing apparatus and method shown in my United States Pat. 3,268,954 achieves a very high quality mat very well suited for these purposes. However, there is still room for improvement, particularly with respect to stabilizing or holding the fibers in place throughout the space occupied by the mat.

SUMMARY OF THE INVENTION

In accordance with the present invention, a tandem series of fiberizers of the type shown in my prior United States patent aforesaid successively lays down thin plies of fibers. An adhesive is sprayed against the fibers as they are picked off of the pulp board so as to expose the fibers thoroughly to the adhesive while the fibers are airborne and before they become compacted or integrated into the mat or ply assembly. Each ply is made relatively thin for good exposure of the fibers thereof to the spray. The fibers have good adhesion one to the other, thus to stabilize the mat fibers against unwanted shifting.

The plies are then laminated one to the other to build up a mat of desired thickness. The adhesive present in the plies binds one ply to the next, thus resulting in a mat of desired thickness but in which all the fibers are bound in relatively firm adherence in a desired spatial relationship.

After the lamination process is completed, the composite mat is calendered to the desired thickness and density and dried to remove excess moisture. Thereafter the composite mat is in readiness for further processing, such as cutting into shapes desired for the fabrication of the final product.

The apparatus incorporates a tandem series of fiberizers disposed over a conveyor screen beneath which there is a vacuum box which functions to draw the fibers onto the screen. The arrangement is desirably such that the pulp web for the last fiberizer completely envelops all of the fiberizers in the series, thus to intercept stray floating fibers and return these to the last fiberizer for incorporation in the mat.

Other objects, features, and advantages of the invention will appear from the following disclosure.

DESCRIPTION OF THE DRAWINGS

FIG. 1 is a diagrammatic vertical cross section taken through apparatus embodying the invention.

FIG. 2 is a fragmentary enlarged diagrammatic illustration showing the adhesive spray against the fibers as they are airborne in the course of transfer from the fiberizing drum to the screen conveyor.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

A series of fiberizers, such as picker drums 10, 11, 12 as are shown in my prior United States Pat. 3,268,954, are enclosed within a housing 13. While three such fiberizers are shown, this number can be increased as desired, depending on the desired number of plies and the ultimate thickness of the mat. The fiberizers can also be the disk type shown in my copending United States patent application Ser. No. 729,249, filed May 15, 1968, now U.S. Pat. 3,538,551 granted Nov. 10, 1970.

Each fiberizer drum 10, 11, 12 is provided with a surface having laterally projecting pins 14, as shown in FIG. 2. FIG. 2 shows the last picker drum 12. A pulp board 15, which may consist of one or more pulp boards as shown in my prior United States patent aforesaid is fed toward the pins 14 by the feed rollers 16 and over a breaker bar 17. Pulp fibers are picked out of the pulp board and are projected longitudinally in the form of an air borne fiber stream 18.

Adhesive is jetted against stream 18 by means comprising spray apparatus 20 which receives liquid adhesive through the pipe 23 and pressurized air through the pipe 24. The spray apparatus 20 and the adhesive may be of any conventional type. The adhesive is typically water soluble or consists of a resin.

An important aspect of the invention is that the adhesive spray 19 contacts the fibers while they are in an air borne stream 18 en route from the fiberizer to their place of deposit on the conveyor screen 25. Screen 25 travels over a vacuum box 31. The air borne streams 18 of adhesively impregnated fiber are drawn by vacuum toward the screen 25. In FIG. 2 the fiber stream 18 lays down as a top ply 26 on top of the preceding plies 27, 28 formed by fiberizers 11, 10.

The respective fiberizers 10, 11 and 12 act in substantially the same manner to treat pulp sheets 15. Accordingly, as shown in FIG. 2, there are three layers or plies 26, 27, 28 of adhesively impregnated fiber which become bonded or laminated together to form a composite mat 30.

In accordance with the present invention, each fiber has been exposed to the adhesive so that within each ply one fiber directly adheres to the next. There is also a good bond between successive plies. This is a substantial improvement over prior art adhesively treated plies of pulp fiber in which the adhesive is sprayed onto the ply after it is formed. It is very difficult to achieve impregnation of the fibers within the ply once the ply is formed. However, in accordance with my invention, the fibers receive adhesive treatment while they are airborne and in an unconsolidated floating state.

The last or end fiberizing drum 12 in the tandem series desirably rotates in the opposite direction from the first two drums 10, 11. Moreover, the pulp web 15 for the drum 12 is trained around the last drum 12, to function as an envelope for all the fiberizers. Accordingly, any stray floating fibers kicked up from the pulp boards by either of the drums 11, 12 will be intercepted by the last web 15 and will be brought back to the drum 12 for reprocessing and ultimate incorporation in the mat 30.

As the composite mat 30 exits from the housing 13 it will receive calendering pressure from the calender rolls 32. The composite mat 30 will be thereby calendered to a uniform density and thickness. The mat 30 then travels through a drying oven 33 to remove excess moisture. Oven 33 has a vacuum box 34 which draws heated air from a heater (not shown) through the inlet throat 35 and through the mat 30. The mat 30 exits from the dryer 33 where it is stripped from the screen 25 as it passes around tail end roller 36. Thereafter the mat is cut into sizes suitable for its end use.

I claim:
1. A method of forming a composite mat of fibrous pulp material and comprising the step of forming individual mat plies by separating fibers from pulp boards to form a plurality of spaced air-borne fiber streams, spraying said fibers with adhesive while the fibers are airborne to thoroughly coat the fibers with the adhesive, and successively depositing the streams of adhesively coated fibers in plies, one on top of the other, on a common moving surface to form a composite mat of adhesively laminated plies.

2. The method of claim 1 followed by the step of calendering said composite mat of plies to a uniform density.

3. The method of claim 1 followed by the step of drying the composite mat of plies to remove excess moisture therefrom.

References Cited

UNITED STATES PATENTS

| | | | |
|---|---|---|---|
| 2,500,282 | 3/1950 | Francis | 156—62.8 |
| 2,565,941 | 8/1951 | Barnard | 156—62.8 X |
| 2,577,205 | 12/1951 | Meyer et al. | 156—62.2 UX |
| 2,600,843 | 6/1952 | Bush | 156—62.8 X |
| 2,612,462 | 9/1952 | Zettel | 156—62.8 X |
| 2,647,851 | 8/1953 | Schwartz | 156—62.8 |
| 2,658,848 | 11/1953 | Labino | 156—62.8 |
| 2,744,044 | 5/1956 | Toulmin | 156—62.2 X |
| 2,830,648 | 4/1958 | Haddox | 156—62.2 |
| 3,012,923 | 12/1961 | Slayter | 156—62.2 |

CARL D. QUARFORTH, Primary Examiner

S. J. LECHERT, Jr., Assistant Examiner

U.S. Cl. X.R.

156—152, 153, 182, 247, 62.8